Patented July 20, 1948

2,445,500

UNITED STATES PATENT OFFICE 2,445,500

MANUFACTURE OF ETHERS OF PHENOLS

Daniel Tyrer, Stockton-on-Tees, England

No Drawing. Application May 22, 1945, Serial No. 595,247. In Great Britain June 9, 1944

8 Claims. (Cl. 260—612)

A well known method for the manufacture of ethers of phenols comprises treating an alkali phenolate with an alkylating agent, such as an alkyl halide or alkyl sulphate. A more recent method has been proposed in which a mixture of a phenol and an alcohol is passed in the form of vapour over a heated dehydration catalyst. The yields obtained by the latter method are comparatively small, and there is a considerable tendency for the alkyl group to enter the nucleus with the formation of an alkyl-phenol. The former method gives better yields, but is costly owing to the necessity for the preliminary preparation of the alkylating agent and of the alkali phenolate often from the hydrocarbon by way of the corresponding sulphonic acid.

According to the present invention, a process for the manufacture of ethers of phenols comprises preparing a substantially solid mixture of an inorganic base and an alkali salt of a sulphonic acid selected from the group consisting of the monosulphonic acids of benzene, toluene, meta-xylene and naphthalene and pyridine-β-monosulphonic acid, subjecting the said mixture at a temperature ranging from 200° C. to 400° C. to the action of the vapour of an alcohol selected from the group consisting of saturated monohydric alcohols of the aliphatic and cycloaliphatic series containing at most 6 carbon atoms, the quantity of the alcohol vapour being in excess of that required to form the ether, and expelling the ether from the reaction mixture with the excess of the alcohol vapour.

As the alcohol there may be used, for example, methyl alcohol, ethyl alcohol, isopropyl alcohol, isoamyl alcohol or cyclohexanol. Since the presence of water tends to cause the conversion of the sulphonate into phenolate it is desirable that the alcohol should be substantially anhydrous or should contain only small quantities of water. Instead of introducing the alcohol vapour as such it may be generated in situ from a derivative of the alcohol which decomposes under the conditions of the reaction to liberate the free alcohol. Thus, for example, a hydrolysable ester of the alcohol, such as methyl chloride, may be introduced. It is necessary, however, to increase the quantity of the base to make good the amount consumed in the hydrolysis.

As the inorganic base there may be used a caustic alkali or other base capable of forming a stable sulphite, for example, an oxide, hydroxide or carbonate of an alkaline earth metal or of magnesium, or an alkali carbonate, such as sodium carbonate, or a strongly basic salt such as tri-sodium phosphate. Calcium hydroxide is especially suitable owing to its cheapness. If desired, mixtures of two or more bases may be used, for example, a mixture of a caustic alkali and calcium hydroxide.

The typical case of the manufacture of anisole from sodium benzene sulphonate, methyl alcohol and caustic soda will serve to illustrate the probable net reaction, which may be represented by the equation:

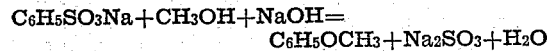

$$C_6H_5SO_3Na + CH_3OH + NaOH = C_6H_5OCH_3 + Na_2SO_3 + H_2O$$

It will be seen that only one molecular proportion of caustic soda is required per molecular proportion of sodium benzene sulphonate. With such a relatively low proportion of caustic soda there is a tendency for the mixture to swell up in the form of a frothy mass of large volume. In order to overcome this difficulty use may be made of the expedient described in my British Patent No. 559,642, May 15, 1944, by incorporating with the sulphonate and alkali an additional solid substance, which is substantially insoluble in fused caustic alkali, in a proportion sufficient to counteract frothing and swelling of the reaction mixture and to maintain it in a substantially solid condition. Such additional substances are calcium hydroxide, magnesia, finely powdered carbon and the other additions mentioned in the aforesaid specification. By thus maintaining the reaction mixture in a substantially solid condition the passage of the alcohol vapour through the mass is facilitated and the alcohol is brought into intimate contact therewith.

The progress of the reaction is assisted by bringing the solid reactants into a state of intimate contact with one another and into a loose and open form which facilitates the passage of the alcohol vapour therethrough and ensures intimate contact of the vapour therewith. For this purpose the mixture of the reactants is brought into the form of solid agglomerated masses containing the sulphonate and base in a state of very intimate contact. Such agglomerated masses are advantageously prepared by mixing the sulphonate and the base, together with any additional solid ingredients, in the presence of water, and evaporating the water, while stirring, to produce a solid granular mass. The granular mass prepared in this manner offers a large surface to the alcohol vapour and contains the solid reactants in a state of very intimate contact. Alternatively, the agglomerated masses may be formed by pelleting or briquetting a moistened mixture of the finely powdered solid ingredients of the reaction mixture.

The process may be carried out by heating the substantially solid reaction mixture in a reaction vessel at the desired temperature while slowly passing a current of the alcohol vapour through the heated mass. In the case of the manufacture of anisole as represented by the above equation, the vapours issuing from the reaction vessel are condensed to yield a mixture of anisole, excess methyl alcohol and water. The methyl alcohol can be recovered for re-use by fractional distillation, and the anisole and water which remain as immiscible layers can be readily separated from one another. The anisole is obtained in a remarkably pure form containing only a trace of phenol which can be easily removed.

While the main reaction is represented by the above equation, there is a tendency for side reactions to occur. For example, a minor proportion of the alkali sulphonate may be converted into phenolate in accordance with the equation:

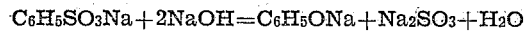

$$C_6H_5SO_3Na + 2NaOH = C_6H_5ONa + Na_2SO_3 + H_2O$$

A small proportion of the phenolate thus formed may be decomposed by the water vapour produced or by the alcohol vapour to yield free phenol, which passes over with the anisole. The lower the temperature the smaller the quantity of free phenol which passes over with the anisole. The presence of water also promotes the conversion of sulphonate into phenolate, so that, as stated above, the alcohol should preferably be substantially free from water. Although in the case of methyl alcohol containing up to 5-10 per cent of water the formation of anisole is still the predominant reaction, the formation of phenol may become the major reaction in the case of ethyl alcohol and higher alcohols if much water is present. However, the use of the alcohol vapour in excess of that required to form the ether, in addition to facilitating the reaction and expelling the ether in the form of vapour, also has the desirable effect of reducing the partial pressure of any water vapour formed and so suppressing its effect in the reaction.

A further side reaction which may occur to a small extent is the formation of alkali alcoholate, for example alkali methoxide, either by direct reaction between the caustic alkali and the alcohol or, more probably, by reaction between alkali phenolate and the alcohol. This is disadvantageous, since it renders useless a part of the alkali, the methoxide apparently not reacting with the sulphonate under the conditions of the reaction. The alcohol fixed in this manner can be easily recovered by distillation after taking up the reaction residue with water.

A still further side reaction, which hardly occurs to any extent in the case of methyl alcohol but may be quite appreciable with higher alcohols, involves the formation of an alkali salt of an aliphatic carboxylic acid accompanied by the liberation of hydrogen. This may be due to the reaction of alkali alcoholate with water vapour, for example, as follows:

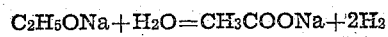

$$C_2H_5ONa + H_2O = CH_3COONa + 2H_2$$

Various expedients will now be described whereby the extent to which the foregoing side reactions occur can be kept small and good yields of the phenol ether obtained.

Thus, it has been found that the nature of the alkali metals present in the sulphonate and the caustic alkali have an important influence on the percentage conversion of sulphonate into the phenol ether. While the process may be carried out with a sulphonate and a caustic alkali of the same alkali metal, namely sodium or potassium, better conversions are obtained by using a mixture of sodium and potassium radicals in relative proportions such that the atomic proportion of potassium ranges from about 23 to 45 per cent of the total atomic proportion of alkali metal present, the potassium radical being present either in the sulphonate or the caustic alkali or both. Such mixtures extend from ½ mol of sodium sulphonate in admixture with ½ mol of potassium sulphonate per 1.2 mols of caustic soda up to 1 mol of potassium sulphonate per 1.2 mols of caustic soda, and the optimum mixture lies between these limits.

The following examples will serve to illustrate the above statements: When 1 mol of sodium benzene sulphonate is heated with 30 per cent of its weight of calcium hydroxide (to counteract frothing) and a slight excess (1.2 mols) of caustic soda in a slow current of methyl alcohol the reaction begins at 290-300° C. and becomes rapid at 320° C., but the reaction practically ceases when 65 per cent of the sulphonate has been converted into anisole and 4.5 per cent thereof into phenolate. When 1 mol of potassium benzene sulphonate is heated in a current of methyl alcohol with 1.2 mols of caustic potash and the same proportion of calcium hydroxide the reaction begins at 200° C. and becomes very rapid at 250° C., but suddenly stops when rather less than 60 per cent of the sulphonate has been converted into anisole and approximately 9 per cent thereof into phenolate. When, however, the process is conducted with 1.2 mols of caustic soda and with mixtures of the sodium and potassium sulphonates containing progressively larger proportions of the potassium sulphonate the percentage conversion of sulphonate into anisole gradually increases up to 86 per cent when the proportion of potassium ranges from 40-45 per cent of the atomic proportion of the total alkali metals present. A further increase in the proportion of potassium leads to a reduction in the percentage conversion of sulphonate into anisole, until a minimum conversion is reached.

A similar result is obtained if the desired ratio of potassium to total alkali metals is wholly or in part secured by the addition of an inert potassium salt, for example, potassium chloride. However, this leads to some dilution of the reaction mixture and increases its volume.

Since the reduced conversion of sulphonate into phenol ether is largely due to a part of the caustic alkali being rendered ineffective by the above described side reactions, it might be thought that an increase in the proportion of caustic alkali would increase the yield of the phenol ether. In practice, however, this leads to no appreciable increase in the proportion of sulphonate converted into the phenol ether, but to a larger proportion of the sulphonate and caustic alkali being consumed in side reactions. Thus, for example, a larger proportion of the sulphonate is converted into phenolate. Accordingly, it is in general preferable to use the theoretical 1 mol of caustic alkali or slightly more than this, or in some cases, referred to hereinafter, to use less than the theoretical quantity. If, however, the production of the phenol is desired as a valuable by-product larger quantities of caustic alkali may be used. This gives the additional advantage of increasing the speed of the reaction.

When calcium hydroxide is used as the base, instead of caustic alkali, the reaction occurs at somewhat higher temperatures. Thus, when an alkali benzene sulphonate is heated with calcium hydroxide in a current of methyl alcohol vapour the anisole reaction commences at about 340° C. and becomes rapid at 380–390° C. As, however, these temperatures are still below those at which the conversion of sulphonate into phenolate proceeds rapidly, only little phenol is formed, and that which is produced is almost entirely volatilised with the anisole, instead of chiefly remaining in the reaction residue in the form of phenolate as is the case when a caustic alkali is used. The reaction with calcium hydroxide as base is more rapid with the potassium sulphonate than with the sodium sulphonate, but the speed of reaction in the case of the sodium sulphonate is increased by an addition of a potassium salt, for example, potassium chloride. The use of the potassium sulphonate with two equivalents of calcium hydroxide leads to an 80–85 per cent conversion of sulphonate into anisole and about a 5–6 per cent conversion into phenol. These results compare very favourably with those obtained with caustic alkali, but the higher temperature required leads to a slight deterioration in the purity of the anisole obtained.

A slight improvement in the above yields is obtained by using calcium hydroxide together with less than the theoretical quantity of caustic alkali. In this case the reaction mixture must be heated to the different reaction temperatures appropriate to each of the two bases. This may be done, for example, by conducting the reaction at two distinct stages of temperature or by progressively increasing the temperature from the range suitable for the caustic alkali to the range of 350–400° C. suitable for the calcium hydroxide. By using 1 mol of potassium benzene sulphonate, 0.75 mol of caustic soda and 2 equivalents of calcium hydroxide, 86 per cent of the sulphonate is converted into anisole and 6 per cent into phenol. A still further improvement is obtained by selecting a favourable ratio of sodium and potassium radicals. For example, by using 0.77 mol of the potassium sulphonate, 0.23 mol of the sodium sulphonate, 0.8 mol of caustic soda (approximately 43 per cent of potassium calculated on the total atomic proportion of alkali metal) and 2 equivalents of calcium hydroxide, the conversion of sulphonate to anisole is 90 per cent and that of sulphonate to phenol is 6 per cent.

When the process is conducted with ethyl alcohol or higher alcohols the effect of water in leading to the formation of the phenol is more pronounced, and an appreciable formation of hydrogen accompanying the production of an aliphatic acid salt occurs. When ethyl alcohol is used with a favourable mixture of sodium and potassium benzene sulphonates, 0.9 mol of caustic soda and two equivalents of calcium hydroxide, and the mass is heated up to 380° C., a 72 per cent conversion of sulphonate to phenetole and an 8 per cent conversion to phenol are obtained. Also about 10 per cent of the alcohol calculated on the weight of the phenolate is converted into alkali acetate. Isopropyl alcohol gives less satisfactory results owing to the tendency towards decomposition and the formation of aliphatic acid. In the case of isoamyl alcohol, however, a 50–60 per cent conversion of sulphonate into isoamyl phenyl ether, representing an 80–85 per cent yield on the sulphonate which enters into reaction, is obtained.

The process may be conducted on the batch principle or in a continuous manner. In the latter case the solid mixture of the reactants may be fed continuously through the reaction vessel in countercurrent to the direction of flow of the alcohol vapour. The continuous process enables a high rate of production of the phenol ether to be maintained.

It will be understood that during the reaction air should be excluded, this being automatically secured by the passage of the alcohol vapour through the reaction mixture. However, a similar precaution should be observed during the heating up and cooling of the material. It is also advisable to avoid contact with substances or surfaces which promote catalytically the decomposition of the alcohol or other reactants or of the products.

The invention also includes the treatment of the reaction residue for the purpose of removing by-products therefrom, recovering unchanged reactants for re-use in the process, and regenerating fresh reactants from the reaction products. Since the reaction becomes uneconomically slow and practically ceases before the whole of the sulphonate has entered into reaction, the residue will contain unchanged sulphonate which it is desirable to recover. Alcohol in the form of alkali alcoholate may also be present in sufficient quantity to warrant its recovery. When phenolate is present it may be recovered as a valuable by-product, or it may be converted into a phenol ether in known manner, if desired, without isolating it from the reaction residue.

When phenolate is present in quantities which make its recovery worth-while, the reaction residue is first treated to recover the phenol by passing steam through the material at about 350–380° C. Any alcohol present will be recovered at the same time.

In order to regenerate caustic alkali the reaction residue is boiled with water in presence of calcium hydroxide to causticise a part of the alkali sulphite present in the residue. The calcium hydroxide for this purpose may be that which has been used as an ingredient of the original reaction mixture, or it may be separately added. It will generally be desirable to causticise sufficient of the alkali sulphite to yield the whole of the caustic alkali required for a fresh reaction. For this purpose the extent of the causticisation can be predetermined by suitably adjusting the concentration of the liquor in known manner. During the causticisation any alcohol which may be present will be expelled and can be recovered. The liquor is then filtered to remove insoluble calcium compounds, and the filtrate is concentrated by evaporation to cause unchanged alkali sulphite to separate. The alkali sulphite thus separated is used in known manner to produce fresh alkali sulphonate.

The liquor remaining after the separation of unchanged alkali sulphite contains the caustic alkali required for a fresh reaction, the unchanged alkali sulphonate and a small amount of residual alkali sulphite. It is then only necessary to add the required additional quantity of alkali sulphonate, and any other addition, such as calcium hydroxide, which may be required, and to work up the liquor into a solid reaction mixture.

The residual alkali sulphite which remains after separating the alkali sulphite used to regenerate alkali sulphonate need not be removed, and may be allowed to remain as a floating stock in the repeated working up of the reaction residue. In fact its retention is of special importance in those cases in which sodium and potassium radicals are both present, in order to maintain the desired ratio of sodium to potassium in the system.

When caustic alkali is not used as the base, the reaction residue after being taken up in water and, if required, after expelling any alcohol present, may be treated with a quantity of the appropriate sulphonic acid sufficient to yield the required amount of alkali sulphonate by reaction with alkali sulphite.

The repeated working up of the reaction residue may in time lead to an undesired accumulation of impurities. It may thus become necessary ultimately to discard the residue, or alternatively the accumulation of impurities may be kept within reasonable limits by occasionally discarding only a portion of the residue and replacing the discarded portion with fresh materials.

The following examples illustrate the invention, the parts being by weight:

*Example 1*

100 parts of potassium benzene sulphonate dissolved in water are mixed with 50 parts of calcium hydroxide, and the resulting slurry is evaporated, while stirring, to produce a dry granular mass. The granular mass is placed in a reaction vessel, and heated to 380–400° C. while a current of dry methyl alcohol vapour is passed through the mass at the rate of about 300 parts per hour. The issuing vapours are condensed and collected. After about 1½ hours the reaction practically ceases.

The condensate is fractionally distilled to recover the methyl alcohol therefrom. The residue contains a two-phase mixture of 46.8 parts of crude anisole, 2.4 parts of phenol and a little water. The residue is washed with a dilute solution of alkali to take up the phenol, and the crude anisole is purified by distillation. 44 parts of purified anisole are obtained.

The residue in the reaction vessel, which contains 10 parts of unchanged potassium benzene sulphonate, is mixed with water, and heated to expel a small quantity of methyl alcohol which is recovered. A quantity of benzene sulphonic acid is added sufficient to bring the total alkali sulphonate to 100 parts, and the mixture is boiled to expel the sulphur dioxide evolved. The insoluble calcium compounds are then removed by filtration, and the required quantity of calcium hydroxide for a fresh reaction is added. The resulting slurry is then converted into a solid granular mass as described above.

The yield of pure anisole calculated on the sulphonate which enters into reaction is approximately 89 per cent and that of phenol is 5.5 per cent. The yield calculated on the methyl alcohol is substantially theoretical provided that all the extraneous alcohol is recovered.

*Example 2*

An aqueous solution containing 151 parts of potassium benzene sulphonate, 41.5 parts of sodium benzene sulphonate and 32 parts of caustic soda is mixed with 74 parts of calcium hydroxide, and the resulting slurry is evaporated, while stirring, to produce a dry granular mass. The mass is progressively heated in a reaction vessel from 250° C. to 400° C. while dry methyl alcohol vapour is passed through it at the rate of about 600 parts per hour. The reaction practically ceases after 1½ hours.

The condensate collected by condensing the issuing vapours is distilled to remove unchanged methyl alcohol, and the residue containing 97 parts of crude anisole and 5.6 parts of phenol is worked up as described in Example 1.

The reaction residue, containing unchanged only 4 per cent of the original sulphonate, is boiled with water a small portion of which is allowed to distill off to remove and recover a little methyl alcohol. Before being boiled the concentration of the liquor (containing alkali sulphite and calcium hydroxide) is adjusted to 170 grams per litre of sulphite calculated as sodium sulphite. At this concentration about 32 parts of caustic soda are regenerated. The liquor is then filtered to remove insoluble calcium compounds, and the filtrate is concentrated by evaporation until the most of the unchanged alkali sulphite is deposited. The sulphite so deposited is separated, and used to prepare fresh alkali benzene sulphonate by treatment with benzene sulphonic acid in known manner. The resulting alkali sulphonate is then added to the causticised solution, and the requisite quantity of calcium hydroxide for a fresh reaction is added. The resulting mixture is worked up into a dry granular mass as described above.

The yield of anisole calculated on the sulphonate which undergoes reaction amounts to 91.5 per cent and that of the phenol to 6 per cent.

*Example 3*

100 parts of the sodium salts of a mixture of sulphonic acids (obtained by sulphonating meta-xylene with strong sulphuric acid at a temperature of 50°–100° C.), 27 parts of caustic potash and 30 parts of calcium hydroxide are worked up into a dry granular mass as described in the preceding examples. The mass is heated at 320–340° C. for 1¼ hours in a current of dry methyl alcohol vapour introduced at the rate of 300 parts per hour. 84 per cent of the sulphonate mixture is converted into xylenyl methyl ether, which represents a yield of 90 per cent calculated on the sulphonate mixture which undergoes reaction.

In order to remove a small quantity of xylenol steam is passed through the reaction residue at a temperature of 340° C. Thereafter the residue is worked up as described in Example 2.

*Example 4*

1 molecular proportion of potassium naphthalene-$\alpha$-sulphonate, 1.2 molecular proportions of caustic soda and 1 molecular proportion of calcium hydroxide are worked up into a dry granular mass as described in the preceding examples. The mass is heated in two stages in a current of dry methyl alcohol introduced at the rate of 600 parts per hour for the first stage over a temperature range of 240–280° C. for ½ hour to cause the caustic soda to react, and in the second stage over a temperature range of 330–380° C. for a further ½ hour to cause the calcium hydroxide to react. There is recovered from the final condensate, after removing the methyl alcohol, a quantity of $\alpha$-naphthyl methyl ether equivalent to a 90 per cent conversion of sulphonate. Negligibly small quantities of $\alpha$-naphthol are formed. The reaction residue may be worked up as described in the preceding examples.

Example 5

A dry granular reaction mixture containing 98 parts of potassium benzene sulphonate, 90 parts of sodium benzene sulphonate, 36 parts of caustic soda and 74 parts of calcium hydroxide is made up as described in the preceding examples. The mixture is heated in a slow current of the vapour of absolute ethyl alcohol introduced at the rate of about 800 parts per hour. The temperature is gradually raised from 280° C. to 380° C. Phenetole is produced at the lower part of this temperature range through the agency of the caustic soda, and at the upper part of the range through the agency of the calcium hydroxide. The entire heating operation takes about 1½ hours.

The condensate yields on fractional distillation ethyl alcohol containing a little water. The alcohol is rendered anhydrous in known manner so that it can be re-used in the process. The residue from the distillation contains 88 parts of phenetole and 2.3 parts of phenol. The latter is removed by washing with a solution of alkali, and the phenetole is purified by distillation.

The reaction residue contains unchanged 20 per cent of the original sulphonate, and also contains a quantity of phenolate equivalent to a further 4.8 parts of phenol. To remove the phenol and alcohol the residue is subjected in the reaction vessel to the action of a slow current of steam while heated to 380–390° C. After cooling out of contact with the air, the residue is worked up as described in Example 2.

Provided that all residual quantities of phenol and alcohol are recovered, the yield of pure phenetole is 88 per cent calculated on the sulphonate which undergoes reaction and that of pure phenol is 9.3 per cent. The yield of phenetole calculated on the alcohol is approximately 84 per cent.

Example 6

A reaction mixture comprising 196 parts of potassium benzene sulphonate, 48 parts of caustic soda and 60 parts of calcium hydroxide is prepared as described in the preceding examples, and heated in a current of the vapour of isoamyl alcohol at a temperature of 300–330° C. for 1½ hours. 50 per cent. of the sulphonate is converted into isoamyl phenyl ether and 12 per cent thereof into phenol, leaving 38 per cent. of unchanged sulphonate in the reaction residue. The phenol produced chiefly remains in the residue as phenolate and includes a certain amount of isoamylphenol. The isoamyl phenyl ether is purified and the reaction residue worked up as described in the preceding examples.

Calculated on the sulphonate which undergoes reaction the yields are approximately 77.5 per cent. of isoamyl phenyl ether and 19.5 per cent. of phenol.

Example 7

A reaction mixture comprising 100 parts of potassium benzene sulphonate, 23 parts of caustic soda and 30 parts of calcium hydroxide is prepared as described in the preceding examples, and is heated in a slow current of the vapour of cyclohexanol at a temperature of 300–330° C. for 1 to 1½ hours. From the condensate there are obtained by fractional distillation 45 parts of cyclohexyl phenyl ether representing a yield on the sulphonate of approximately 50 per cent. About 15 per cent of the sulphonate forms phenol, while 35 per cent remains unchanged and can be recovered from the reaction residue in a manner similar to that described in the preceding examples.

Example 8

A reaction mixture comprising 100 parts of sodium β-pyridine sulphonate, 28 parts of caustic potash, 7 parts of caustic soda and 50 parts of calcium hydroxide is made up in the manner described in the preceding examples. The dry mixture is heated in a slow current of the vapour of methyl alcohol. The reaction commences at about 240° C. and becomes rapid at 260° C. After heating from 240° C. to 290° C. over a period of 50 minutes the reaction is substantially complete.

The condensate is subjected to fractional distillation to remove the excess of methyl alcohol, the residue consisting of 39 parts of β-pyridyl methyl ether with a little water in which the ether is soluble. The product is isolated by continuing the distillation. The water which distils first carries with it a little of the ether, and the latter can be recovered by solvent extraction.

Substantially the whole of the sulphonate undergoes reaction. Approximately 65 per cent thereof is converted into the pyridyl ether and approximately 35 per cent into β-pyridol. The latter may be recovered from the reaction residue by passing steam therethrough.

I claim:

1. A process for the manufacture of ethers of phenols, which comprises preparing a substantially solid mixture of an inorganic base and an alkali salt of a sulphonic acid selected from the group consisting of the monosulphonic acids of benzene, toluene, meta-xylene and naphthalene and pyridine-β-monosulphonic acid, subjecting the said mixture at a temperature ranging from 200° C. to 400° C. to the action of the vapour of an alcohol selected from the group consisting of saturated monohydric alcohols of the aliphatic and cycloaliphatic series containing at most 6 carbon atoms, the quantity of the alcohol vapour being in excess of that required to form the ether, and expelling the ether from the reaction mixture with the excess of the alcohol vapour.

2. A process as claimed in claim 1, wherein the alcohol vapour is used in a substantially anhydrous condition.

3. A process as claimed in claim 1, wherein a caustic alkali is used as inorganic base.

4. A process as claimed in claim 1, wherein calcium hydroxide is used as inorganic base.

5. A process as claimed in claim 1, wherein caustic alkali and calcium hydroxide are used as inorganic bases, and the reaction mixture is heated at the different reaction temperatures within the range of 200° C. to 400° C. appropriate to each of the two bases.

6. A process for the manufacture of ethers of phenols, which comprises bringing a mixture of an inorganic base and an alkali salt of a sulphonic acid selected from the group consisting of the monosulphonic acids of benzene, toluene, meta-xylene and naphthalene and pyridine-β-monosulphonic acid into the form of solid agglomerated masses containing the said base and salt in a state of very intimate contact, subjecting the mixture in that form at a temperature ranging from 200° C. to 400° C. to the action of the vapour of an alcohol selected from the group consisting of saturated monohydric alcohols of the aliphatic and cycloaliphatic series containing at most 6 carbon atoms, the quantity of the alcohol vapour being in excess of that required to form the ether, and expelling the ether from the reaction mixture with the excess of the alcohol vapour.

7. A process for the manufacture of ethers of phenols, which comprises preparing a substantially solid mixture of an inorganic base and an alkali salt of a sulphonic acid selected from the group consisting of the monosulphoiic acids of benzene, toluene, meta-xylene and naphthalene and pyridine-β-monosulphonic acid, the said mixture containing both sodium and potassium radicals in a proportion relatively to one another such that the atomic proportion of potassium ranges from about 23 to 45 percent of the total atomic proportion of alkali metal present, subjecting the said mixture at a temperature ranging from 200° C. to 400° C. to the action of the vapour of an alcohol selected from the group consisting of saturated monohydric alcohols of the aliphatic and cycloaliphatic series containing at most 6 carbon atoms, the quantity of the alcohol vapour being in excess of that required to form the ether, and expelling the ether from the reaction mixture with the excess of the alcohol vapour.

8. A process as claimed in claim 7, wherein the said atomic proportion of potassium ranges from 40 to 45 per cent.

DANIEL TYRER.

REFERENCES CITED

The following references are of record in the file of this patent:

UNITED STATES PATENTS

| Number | Name | Date |
|---|---|---|
| 549,728 | Krafft | Nov. 12, 1895 |
| 1,210,726 | Tyrer | Jan. 2, 1917 |
| 1,372,434 | Johlin | Mar. 22, 1921 |

OTHER REFERENCES

Moreu, "Bulletin de la Societe Chim. de Paris," 3rd series, vol. 19, 1898, pages 402, 403. (Copy in Sci. Lib.)